United States Patent [19]

Beaussant

[11] Patent Number: 5,200,856
[45] Date of Patent: Apr. 6, 1993

[54] HELMET SIGHT INCLUDING A GRATICULE IMAGE WITH INCREASING DEVIATION WITH HELMET DISPLACEMENT

[75] Inventor: Raymond Beaussant, Bretigny, France

[73] Assignee: Intertechnique, Plaisir, France

[21] Appl. No.: 834,057

[22] Filed: Feb. 11, 1992

[30] Foreign Application Priority Data

Feb. 12, 1991 [FR] France ................ 91 01611

[51] Int. Cl.[5] ............................. G02B 27/10
[52] U.S. Cl. ...................... 359/630; 359/633; 340/705
[58] Field of Search .............. 359/630, 631, 633; 340/705

[56] References Cited

U.S. PATENT DOCUMENTS 3,666,887  5/1972  Freeman ............... 359/633
4,909,459  3/1990  Patterson .

FOREIGN PATENT DOCUMENTS 0361369  4/1990  European Pat. Off. .
8801968  3/1988  PCT Int'l Appl. .
1520154  8/1978  United Kingdom .
1578136  11/1980  United Kingdom .
2143948  2/1985  United Kingdom .
2163943  3/1986  United Kingdom .

*Primary Examiner*—Jon W. Henry
*Attorney, Agent, or Firm*—Larson & Taylor

[57] ABSTRACT

A helmet sight comprises a collimator for projection of the image of a sighting graticule into the ocular field of the wearer of the helmet and sensors for measurement of the angular position of the helmet with respect to a structure, such as the cockpit of an aircraft. The collimator for projection gives the graticule a position whose angular deviation $\Delta a$, $\Delta b$ with respect to a reference orientation linked to the helmet has remained an increasing function of the angular displacements of the helmet with respect to the reference structure.

5 Claims, 1 Drawing Sheet

HELMET SIGHT INCLUDING A GRATICULE IMAGE WITH INCREASING DEVIATION WITH HELMET DISPLACEMENT

The present invention relates to helmet sights of the type comprising collimator means for projecting an image of a monocular aiming graticule or mark into the ocular field of the wearer of the helmet and means of measurement of the angular position of the helmet with respect to a reference structure, such as the cockpit of an aircraft occupied by a crew member equipped with the helmet. The term "helmet" must be interpreted widely and as designating any headgear fastened onto the head of a wearer and moving with it.

Such sights are already known which permit the wearer of the helmet to indicate a target simply by aligning the image of the graticule with this target. The localisation is carried out using means of calculation which receive the signals supplied by the means of measurement.

Current sights are designed to project the image of the graticule at a defined position with respect to the helmet, usually in the centre of the monocular field of the wearer of the helmet. As a consequence, the angular field in which the sighting is possible is much smaller than the field of vision which the wearer of the sight can see by combination of movements of the head and movements of the eye: due to the fact that the positioning of the graticule with respect to the head is immovable, the sighting field is limited to the region of angular freedom of movement of the head.

It is an object of the invention to increase the sighting field, employing only simple means.

With this purpose in mind, there is provided a sight of the type defined above wherein the collimator means for projection are designed to give the graticule a position whose angular deviation with respect to a reference orientation linked to the helmet (generally the axis of the monocular field used, right or left) increases with the angular displacements of the helmet, with respect to the reference structure, from a predetermined middle position.

In practice, this automatic adjustment of the position of the graticule in the field does not require appreciable complication of the collimator optical system for image formation. Often in fact the image formed by the means of projection comprises not only that of the graticule, but information symbols for the wearer, which requires supplying in the object plane a representation of an area which extends far beyond the graticule; put another way the optical system exhibits a significant field. In this case it is consequently sufficient to associate the means of generation of symbols in the object plane of the collimator means of projection, constituted for example by a liquid crystal screen, with electronics making it possible to form the graticule at various positionings of the means of generation, that is to say of the field of the optical system.

The law of variation of the positioning of the graticule with respect to the centre of the image supplied by the means of projection can be linear; it can however be preferable to adopt a non-linear law, for example in order to maintain the graticule in a centred position, that is to say in the median orientation, giving a maximum precision to the aiming, for as long as the angular displacements of the head and of the helmet are small.

In every case, the invention uses the mobility of the eye with respect to the head in order to enhance the sighting field possible in proportions which make it possible to approximate it to the total field of observation of the wearer of the helmet.

The invention will be better understood on reading the description which follows of a particular application of the invention, given by way of a non-limiting example. The description refers to the drawings which accompany it, in which.

Figure 1:
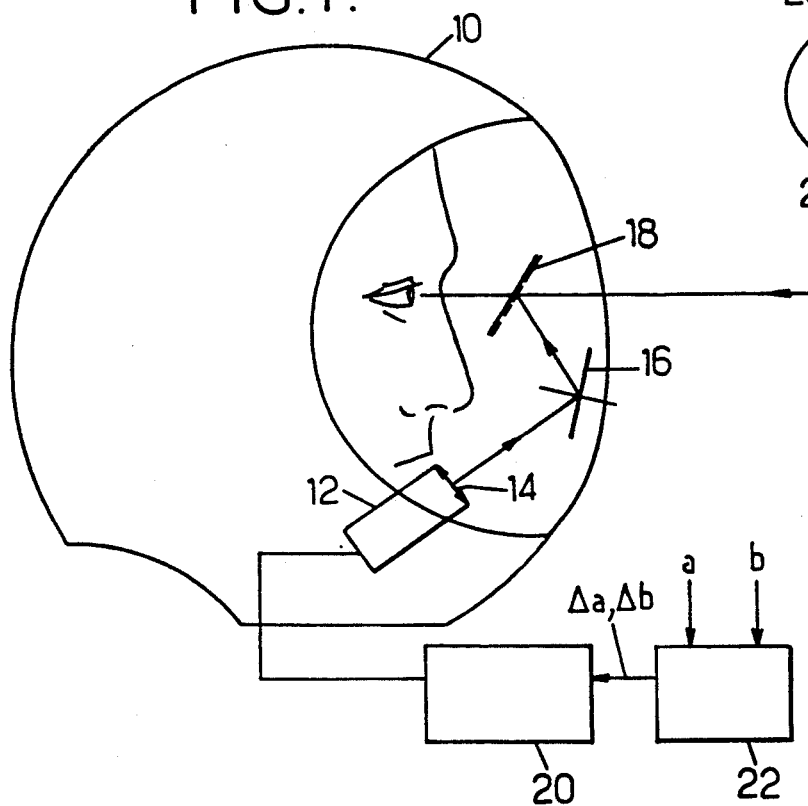
FIG. 1 is a basic diagram of the essential components of a helmet sight which can be produced in accordance with the invention.

The helmet sight shown schematically and by way of example in FIG. 1 is of a particularly simple construction. It comprises collimator means of projection of an image of a sighting graticule into the ocular field of the wearer of the helmet. These means are constituted by optical elements fixed onto the helmet 10 and making it possible to form the image of a graticule, generated by an image generator 12, at infinity in the monocular field. These optical elements comprise collimating lenses 14, a reflecting mirror 16 and a semi-transparent blade 18.

The sight also comprises external elements, represented as constituted by electronics 20 for control of the image generator 12 and a calculating element 22. The image can for example be supplied by a miniature cathode ray tube or a liquid crystal matrix. The assembly constituted by the image generator and the control electronics can be regarded as constituting a graticule generator.

Figure 2:
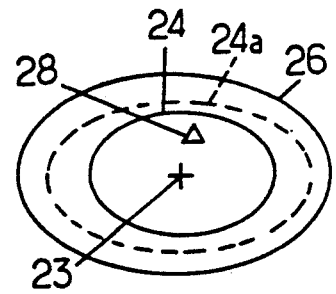
FIG. 2 is a diagram showing the shape of the boundaries of the monocular visual field of a wearer of a sight, the sighting field of an eye fitted with a helmet sight of conventional type and the sighting field enlarged by employment of the invention.

In current sights, the control electronics 20 are constituted so as to form the image 23 of the graticule at the centre of the monocular field 24, that is to say in the median orientation of the eye. In these conditions, as FIG. 2 shows, the angular sighting region 24 is limited to the solid angle of freedom of movement of the head and it is very much less than the field of vision 26 which the combination of ocular movements and of movements of the head allows. The graticule generator is frequently designed to make it possible to form, in the ocular field, the image of supplementary symbols, such as 28, indicating the position of a target or of a threat.

In order to enhance the sighting field, the electronics 20 and the calculator 22 are provided in order to give the graticule a position which is centred only when the helmet occupies a predetermined angular position or median angular area.

Figure 3:
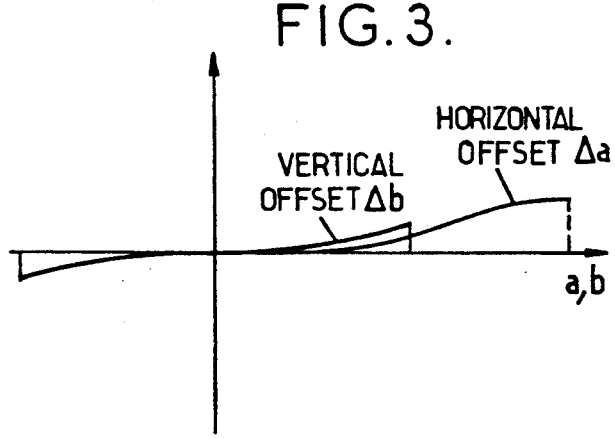
FIG. 3 shows possible curves of variation of the position of the graticule in the visual field, given by way of example.

For that reason the calculator 22 receives, from position sensors which are not shown, signals indicating the angular position of the helmet 10, for example the horizontal a and vertical b components of the displacement of the helmet from the middle position. The calculator 22 derives, on the basis of a and of b, deviations $\Delta a$ and $\Delta b$ which can obey the same law of variation or different laws of variation. These laws can be linear or otherwise. The deviation can be symmetric or otherwise with respect to the middle position. In the case illustrated in FIG. 3, the variation in the deviation is small or nil for the small angles a and b, so that the sighting precision is not degraded in the central part of the ocular field.

Figure 4:
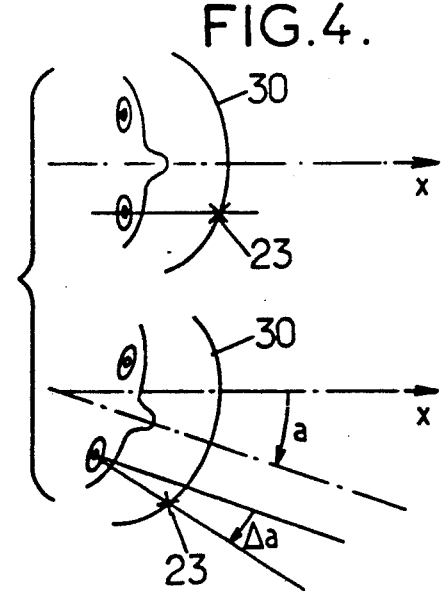
FIG. 4 is a diagram intended to show the angular deviation given to the graticule during angular displacements of the helmet.

FIG. 4 shows for example the offset given to the image 23 of the graticule through the visor 30 when the helmet passes from its middle position along x to an orientation a.

The invention makes it possible to considerably enhance the sighting field (at the maximum to correspond to the optical field) and, for example, to move it to the area indicated at 24a in FIG. 2.

The values $\Delta a$ and $\Delta b$ are supplied by the calculator 22 to the weapon systems computer so that the latter can calculate the position of the target sighted with respect to the reference structure on the basis of the values a, b, $\Delta a$ and $\Delta b$.

The invention is applicable to all types of sights whose image generator makes it possible to supply an offset symbol of a know and adjustable value with respect to a reference position. It is applicable for example to helmet sights whose optical assembly comprises curved and/or holographic mirrors and is equally applicable whatever the means of measurement of the angular position of the helmet, which can be electromagnetic or can be electromechanical as described in the patent application filed on the same day as the present application and claiming the priority of French patent application N° 91 01610.

I claim:

1. Helmet sight comprising collimator means for projecting an image of a monocular aiming graticule into the field of vision of the wearer of the helmet and means of measurement of the angular position of the helmet with respect to a reference structure, wherein the collimator means of projection are designed to give the graticule an angular position whose deviation ($\Delta a$, $\Delta b$) with respect to a reference orientation linked to the helmet increases with the angular displacements (a, b) of the helmet from a predetermined middle position with respect to the reference structure, the deviation being in the direction of the displacement of the helmet.

2. Sight according to claim 1, wherein said reference orientation (x) is the orientation of the eye of the wearer of the helmet looking at the centre of the monocular field.

3. Sight according to claim 1, wherein the law of variation is linear.

4. Sight according to claim 1, wherein the law of variation is such that the deviation varies less quickly, or does not vary, for angular displacements of the helmet which are less than a determined threshold than for displacements which exceed this threshold.

5. Sight according to claim 1, wherein the collimator means of projection comprise an image generator supplying, in the object plane of an optical system, the representation of an area in an optical field widely exceeding the graticule when the latter is in its centred position.

* * * * *